United States Patent [19]
Hollebrands et al.

[11] Patent Number: 5,855,060
[45] Date of Patent: Jan. 5, 1999

[54] FLEXIBLE FRAMING APPARATUS

[75] Inventors: James J. Hollebrands, Sterling Heights; William M. Hulle, Harrison Township; Dennis M. Hundt, Troy; Robert M. Long, Shelby, all of Mich.

[73] Assignee: Western Atlas, Inc., Hebron, Ky.

[21] Appl. No.: 705,189

[22] Filed: Aug. 29, 1996

[51] Int. Cl.⁶ .................................................. B23P 19/04
[52] U.S. Cl. .............................. 29/771; 29/787; 29/281.5
[58] Field of Search ............................... 29/281.1, 281.4, 29/281.5, 771, 787, 822, 897.2, 464

[56] References Cited

U.S. PATENT DOCUMENTS

| | | | |
|---|---|---|---|
| 4,768,272 | 9/1988 | Weaver et al. | 29/281.5 |
| 5,397,047 | 3/1995 | Zampini | 29/464 X |
| 5,400,943 | 3/1995 | Rossi | 29/464 X |
| 5,619,781 | 4/1997 | Ffield et al. | 29/897.2 X |
| 5,642,563 | 7/1997 | Bonnett | 29/771 |

FOREIGN PATENT DOCUMENTS

| | | | |
|---|---|---|---|
| 54-5276 | 1/1979 | Japan | 29/464 |
| 5-124549 | 5/1993 | Japan | 29/897.2 |

*Primary Examiner*—S. Thomas Hughes
*Attorney, Agent, or Firm*—Barnes, Kisselle, Raisch, Choate, Whittemore & Hulbert, P.C.

[57] ABSTRACT

Framing apparatus for the assembly of the body parts of a truck cab including a bottom panel, a back panel, and right and left side panels. A framing station has a base adapted to support the bottom panel. Side framers on opposite sides of the base are adapted to support the right and left side panels. The side framers are moved to positions adjacent to the base in which the lower edge portions of the side panels contact the side edge portions of the bottom panel so that they can be connected together. A rear framer is adapted to support the rear panel at the rear of the base. The rear framer is moved to a position adjacent to the base in which the lower edge portion of the rear panel contacts the rear edge portion of the bottom panel so that they can be connected together and the side edge portions of the rear panel contact the rear edge portions of the side panels so that they can be connected together. The several body parts are then permanently connected together utilizing suitable tooling.

15 Claims, 4 Drawing Sheets

FLEXIBLE FRAMING APPARATUS

FIELD OF THE INVENTION

This invention relates generally to framing apparatus and more particularly to flexible framing apparatus for assembling the body parts of vehicle such as truck cabs of varying dimensions.

BACKGROUND OF THE INVENTION

Truck cabs are composed of several body parts, including side panels, a rear panel, a bottom panel and a header. They are built to various different dimensions and specifications depending on whether the cab is a "day" cab or a "sleeper". The depth of space behind the driver may be 70 inches or more for sleepers and considerably less for the so-called day cabs which are designed without sleeping space. The task of assembling these body parts is arduous and time-consuming.

SUMMARY OF THE INVENTION

The present invention relates to a flexible framing apparatus which greatly simplifies the assembly of the body parts of vehicles such as truck cabs and substantially reduces assembly time, for both sleepers and day cabs. A framing station is provided having a base on which the bottom panel or pan of the truck cab is supported. Side framers on opposite sides of the base are adapted to carry the side panels, which may be of different lengths depending upon the design of the cab. A rear framer adapted to carry the rear panel of the cab is provided at the rear of the base. These side and rear framers are mounted for movement toward and away from an advanced position in which the side and rear panels are brought together around the bottom panel in positions where they may be permanently connected together. The header extends between and is secured to the side panels at the front. Preferably, a rear ramp is provided for delivering the bottom pan to the framing station, and a front ramp is provided for removing the truck body after assembly. Tooling preferably is provided to connect the panels together.

One object of this invention is to provide a flexible framing apparatus having the foregoing features and capabilities.

Another object is to provide a flexible framing apparatus which is composed of a relatively few simple parts, is rugged and durable in use, and is capable of ready manufacture and assembly.

BRIEF DESCRIPTION OF THE DRAWINGS

These and other objects, features and advantages of the invention will become more apparent as the following description proceeds of the preferred embodiment and best mode, especially when considered with the accompanying claims and drawings wherein:

DETAILED DESCRIPTION

Figure 1:
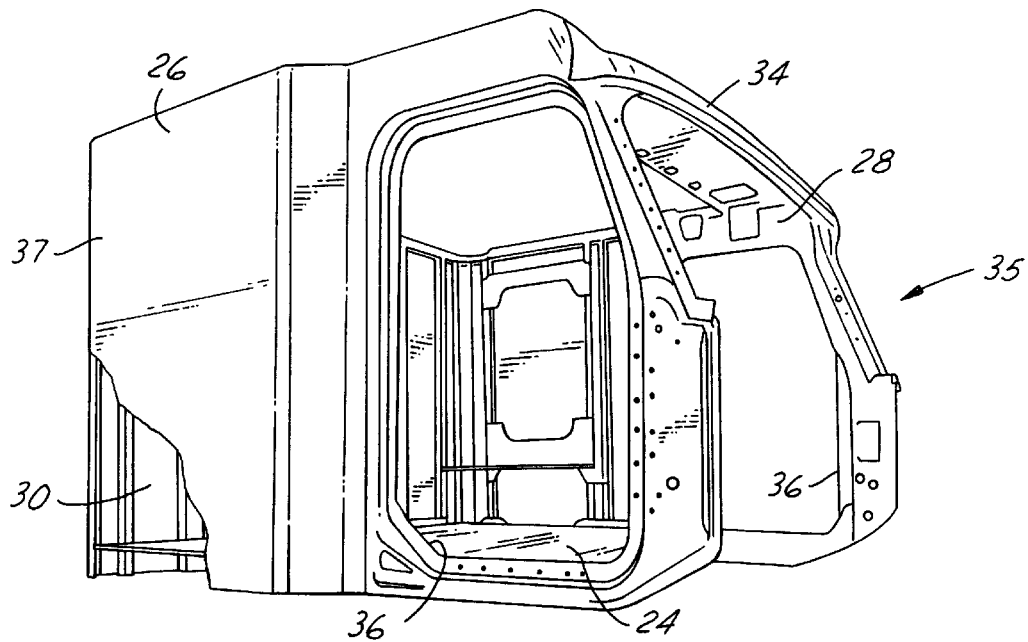
FIG. 1 is a perspective view of an assembled truck cab, made by framing apparatus embodying this invention.

Referring now more particularly to the drawings, the framing apparatus 10 comprises a framing station 12, laterally spaced-apart side framers 14 and 16, a rear framer 18, a rear loading ramp 20, and a front discharge ramp 22.

Figure 3:
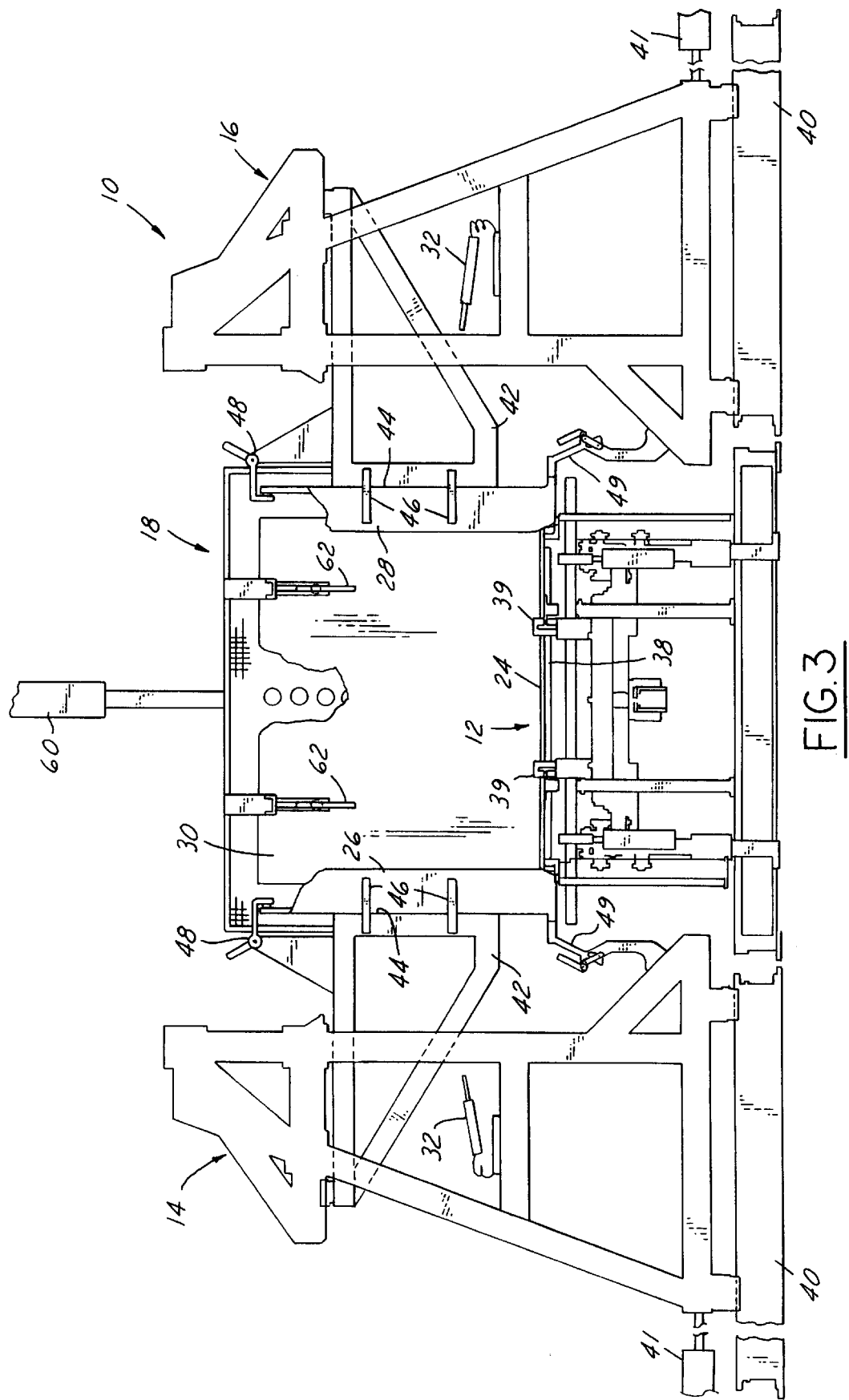
FIG. 3 is a side view of the framing apparatus shown in FIG. 2.

The framing apparatus is adapted to bring together certain body parts of a truck cab for assembly, namely, a bottom panel or pan 24, two side panels 26 and 28, and a rear panel 30. These body parts are brought together at the framing station and attached to one another by suitable tooling 32 on the side and/or rear framers as shown diagrammatically in FIG. 3, or separate therefrom, if desired. A header 34 is also positioned by tooling and attached to the front portion of the side panels 26 and 28.

An assembled truck cab 35 is shown in FIG. 1. The side panels 26 and 28 are mirror images of one another, each having a door opening 36 near the front, and a rear section 37 which may be of varying different lengths depending on the design of the cab. The bottom panel 24 and the rear panel 30 are generally rectangular panels.

Figure 4:
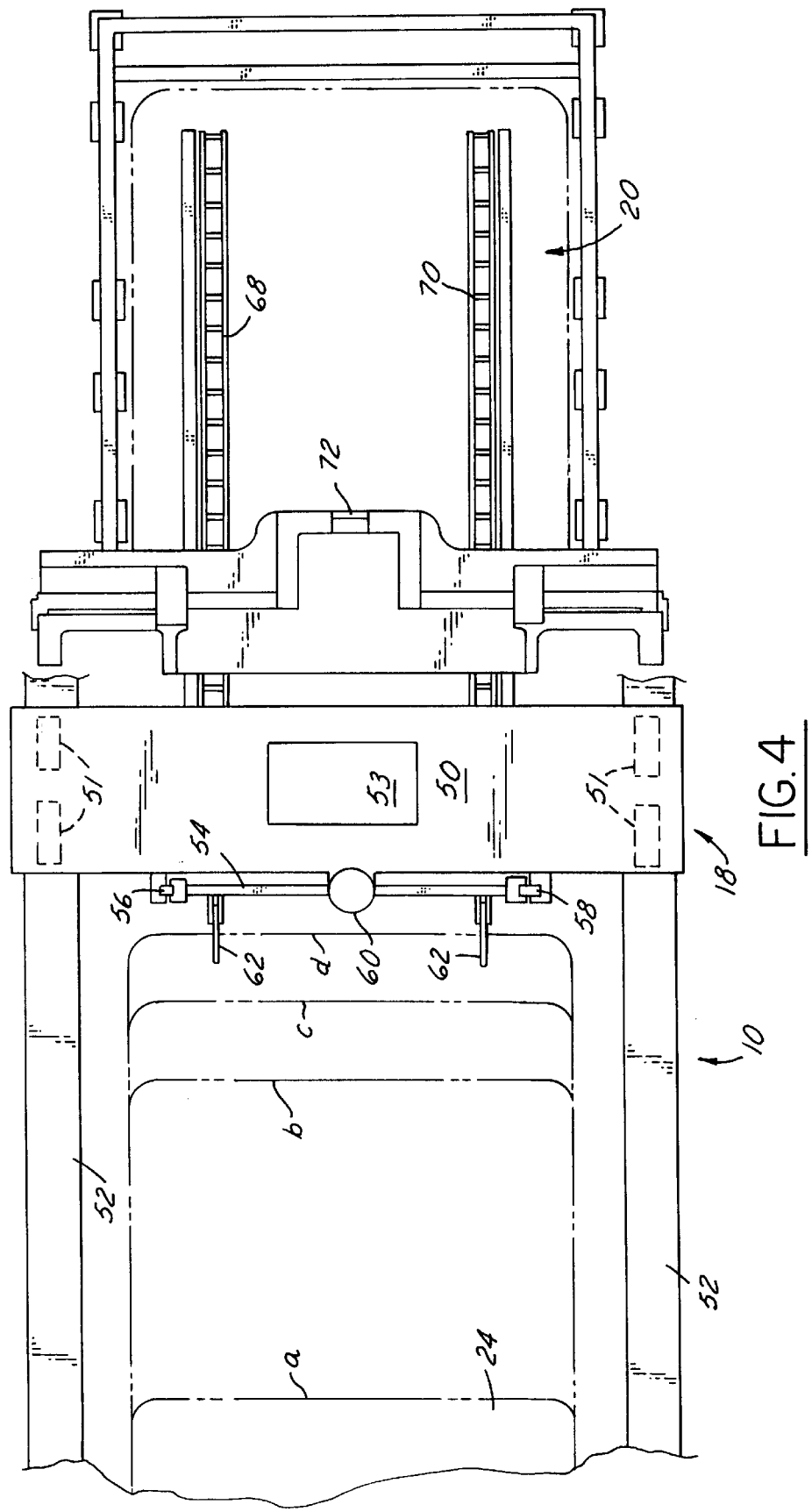
FIG. 4 is a fragmentary top view showing the framing station, the rear loading ramp and the rear framer and also showing an outline of truck cabs of different lengths, but omitting the side framers.

The framing station 12 has a horizontal base 38 on which the bottom panel 24 is mounted and secured by releasable clamps 39. The side framers 14 and 16 are disposed on opposite sides of the framing station 12 and are mounted on tracks 40 for sliding movement toward and away from the framing station. The side framers are moved on the tracks by reversible drive motors 41. Each side framer has on the side facing the framing station a panel support 42 defining a vertical panel support surface 44 against which an upright side panel is adapted to be secured by releasable clamps 46 and 48. The clamps 46 may engage the front edges of the side panels or project through the door opening therein and clamp around the margin on the opening. Clamps 48 extend from the side framer over the top of the side panel. Retainers 49 (FIG. 3) on the side framers provide abutments for the lower portions of the side panels. The clamps 46 and 48 hold the side panels 26 and 28 at an elevation such that the lower edge portions of the side panels are at the same level or elevation as the side edges of the bottom panel 24. The clamps are capable of clamping side panels of various different lengths. FIG. 4 shows in phantom outline truck cabs 35 of different lengths identified by the letters a, b, c and d, the one designated "a" being a day cab. The letters b, c and d designate "sleeper" cars of different lengths.

Figure 2:
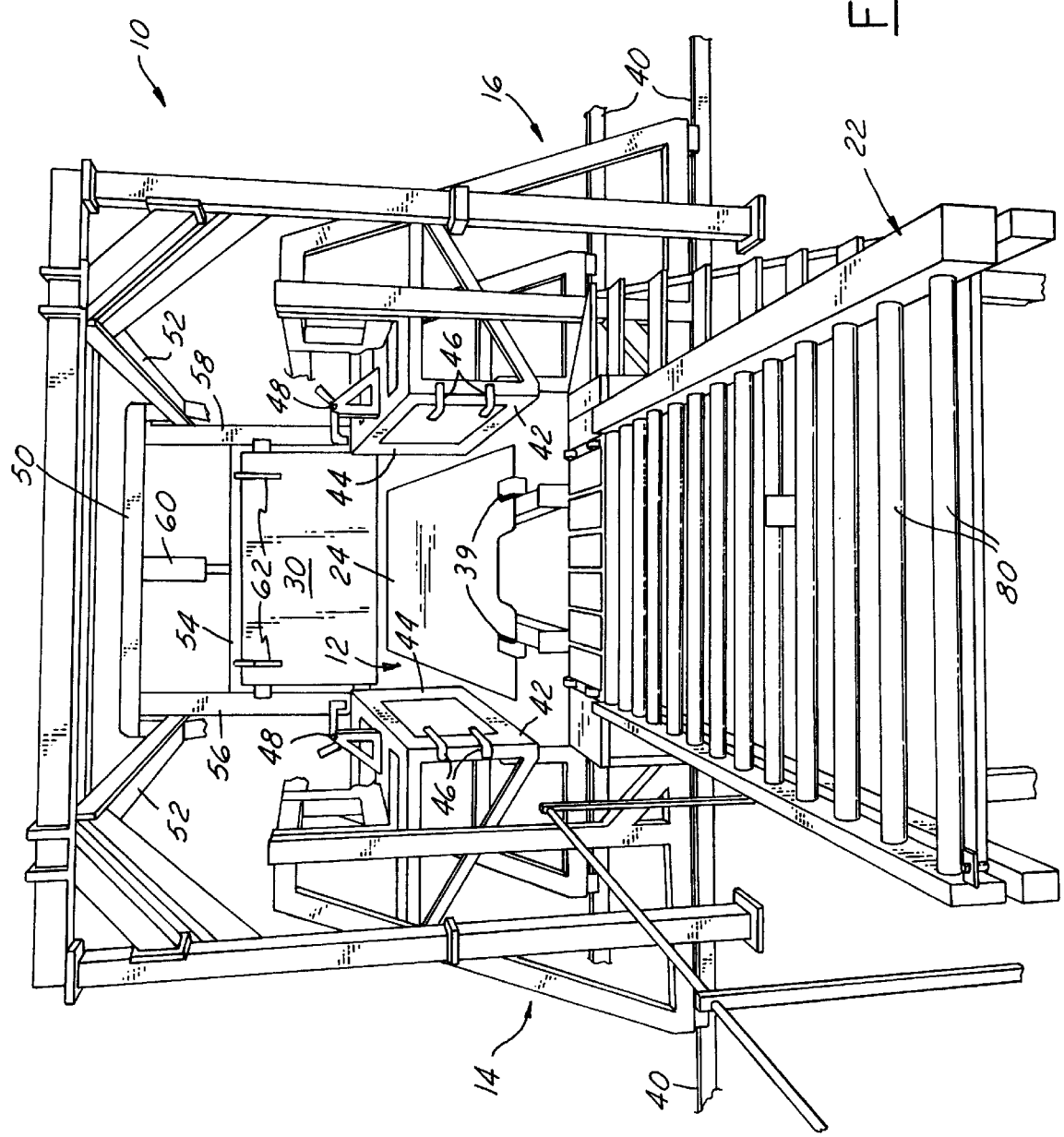
FIG. 2 is a front perspective view of framing apparatus embodying the invention in which the bottom pan and rear panel can be seen, but the side panels are omitted for clarity.

As shown in FIGS. 2 and 4, the rear framer 18 comprises a carriage 50 mounted on overhead tracks 52 for sliding movement toward and away from the framing station 12. A reversible drive 53 is provided for advancing and retracting the carriage. A rear panel support frame 54 slides on laterally spaced-apart vertical rails 56 and 58 extending downwardly from the carriage. A reversible piston-cylinder assembly 60 mounted on the carriage moves the frame 54 up and down. The frame 54 is disposed in a vertical plane and is adapted to support the rear panel 30 of the cab to be assembled. Releasable clamps 62 secure the rear panel 30 in upright position against the front face of the support frame 54. Suction cups 66 on the frame 54 also function to retain the rear panel.

When properly secured to the panel support frame 54, the side edges of the rear panel 30 are longitudinally aligned with the rear edges of the side panels supported on the side framers when the side framers are in their advanced positions adjacent to the framing station. The support frame 54 can be lowered by the piston-cylinder assembly 60 to a position in which the lower edge portion of the rear panel 30 supported thereby is at the level or elevation of the rear edge of the bottom panel 24 supported on the base in the framing station. The support frame 54 can be raised by the piston-cylinder assembly 60 to an elevation sufficient to provide clearance during the transfer of the bottom panel 24 from the rear loading ramp 20 to the framing station 12.

Figure 5:
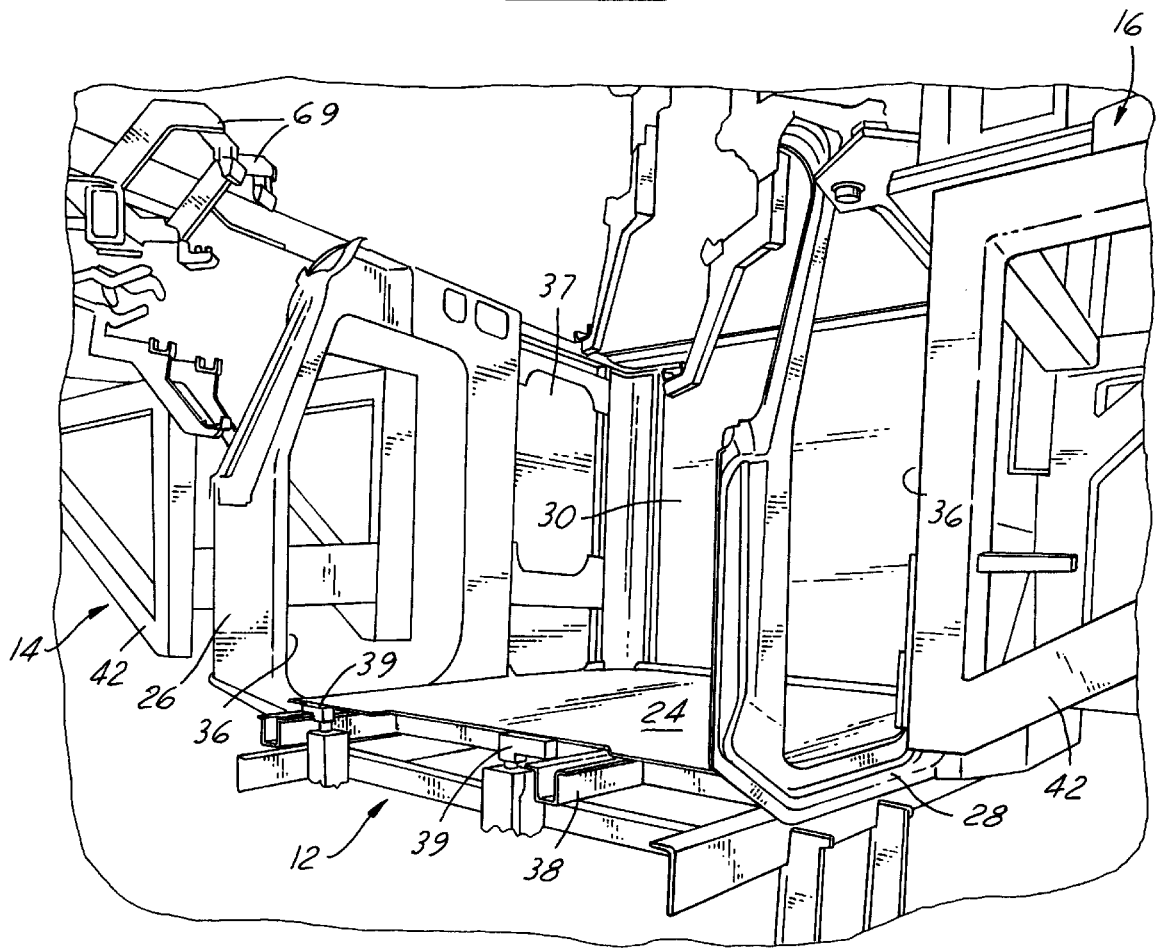
FIG. 5 is a fragmentary perspective view of this framing station and showing the assembled truck cab after the side framers have been partially withdrawn, in which the side framers are of a somewhat modified construction.

The header 34 is clamped to the top front of the side panels by header clamps 69 mounted on the slightly modified side framers shown in FIG. 5.After the side framers 14 and 16, with side panels thereon, are advanced, the header 34 is positioned between the side panels and engaged by the clamps 69.

Two sets of free-turning rollers 68 and 70 support a bottom panel 24 on the rear loading ramp 20 and facilitate the transfer of the bottom panel to the base 38 at the framing station. A stop 72 at the front of the ramp normally blocks the transfer of a bottom panel to the framing station, but can be lowered to release the bottom panel and permit the transfer. The discharge ramp 22 comprises a plurality of transverse free-turning rollers 80 over which an assembled truck body is discharged after assembly.

In use of the framing apparatus, the stop 72 is lowered and a bottom panel 24 on the rear loading ramp 20 is transferred to the base 38 at the framing station 12 manually or by any suitable means, after which the stop 72 is again raised. The bottom panel 24 is located and clamped to the base 38 at the framing station by clamps 39. The side panels 26 and 28 are located on and releasably secured to the side framers by the clamps 46 and 48 in positions with the lower edge portions of the side panels on a level with the opposite side edges of the bottom panel 24. The side framers 14 and 16 are then moved toward the framing station 12 to their advanced positions in which the lower edge portions of the side panels 26 and 28 are disposed closely adjacent to and in alignment and contact with the adjacent opposite side edges of the bottom panel 24.

A rear panel 30 is located on and secured to the rear panel support frame 54 of the rear framer 18 by the clamps 62 and suction cups 66. The rear panel support frame 54 is then lowered by the piston-cylinder assembly 60 so that the lower edge portion of the rear panel 30 is at the same level as the rear edge of the bottom panel. The lateral positioning of the rear panel 30 on the support frame 54 should be such that the opposite side edges thereof are in longitudinal alignment with the rear edges of the side panels. The rear framer 18 is then moved toward the framing station 12 to an advanced position in which the lower edge portion of the back panel 30 is aligned and in contact with the rear edge of the bottom panel 24 and the opposite side edge portions of the rear panel are aligned and in contact with the rear edge portions of the side panels 26 and 28. The location of the rear panel support frame 54 in its advanced position will depend upon the length of the side panels which varies depending upon the length of the "day" or "sleeper" cab being assembled. The advance of the panel support frame 54 will be just far enough to bring the lower edge portion of the rear panel into contact with the lower edge portion of the bottom panel and the side edge portions of the rear panel into contact with the rear edge portions of the side panels.

The header 34 is then placed between the side panels and its ends are clamped to the top front portions thereof by clamps 69.

With the bottom, rear and side panels and the header now contacting one another as described, the tooling 32 is employed to permanently connect the panels and the header together. Additional tooling may be employed, as needed. The tooling may, for example, consist of various devices for drilling through holes and installing rivets or other fasteners to secure together abutting portions of adjacent panels.

After the body parts are secured together, the clamps 46 and 48 are opened to release the side panels 26 and 28 from the side framers 14 and 16, the clamps 62 are opened and suction cups 66 released to release the rear panel 30 from the rear panel support frame 54 of the rear framer 18, the clamps 69 are opened to release the header, the side and rear framers 26, 28 and 30 are retracted away from the framing station 12, and the clamps 39 are opened to release the bottom panel 24. Then, the assembled truck or cab body may be removed from the framing station over the discharge ramp 22.

What is claimed is:

1. Framing apparatus for the assembly of the body parts of a vehicle cab including a bottom panel, a back panel, and right and left side panels, said apparatus comprising:

a framing station having a base adapted to support the bottom panel in a horizontal position, laterally spaced-apart first and second side framers disposed respectively on opposite sides of said base, releasable side panel holders adapted to support the right and left side panels in upright positions on said respective first and second side framers with the lower edge portions of the side panels at approximately the same level as the bottom panel on said base, side tracks carrying said side framers for lateral movement toward and away from advanced positions closely adjacent to the sides of said base with the lower edge portions of the side panels supported thereon juxtaposed to the side edge portions of the bottom panel so that the lower edge portions of the side panels can be connected to the side edge portions of the bottom panel, first and second drives for moving said side framers on said tracks, a rear framer, releasable rear panel holders adapted to support the rear panel in an upright position on said rear framer with the lower edge portion of the rear panel at approximately the same level as the bottom panel on said base and the side edge portions of the rear panel longitudinally aligned with the side edge portions of the side panels, a rear track carrying said rear framer for longitudinal movement toward and away from an advanced position closely adjacent to the rear of said base in which the lower edge portion of the rear panel supported thereon is juxtaposed to the rear edge portion of the bottom panel so that the lower edge portion of the rear panel can be connected to the rear edge portion of the bottom panel and in which the side edge portions of the rear panel are juxtaposed to the rear edge portions of the side panels when the side framers are in the advanced positions thereof so that the side edge portions of the rear panel can be connected to the rear edge portions of the side panels, and a third drive for moving said rear framer on said rear track.

2. Framing apparatus as defined in claim 1, wherein said side panel holders are adapted to support side panels of differing lengths depending on the length of the cab to be assembled, and said advanced position of said rear framer is variable depending on the length of the side panels supported on the side framers.

3. Framing apparatus as defined in claim 1, wherein said rear framer has a panel support frame on which the rear panel is mounted, and further including a fourth drive for raising and lowering said panel support frame.

4. Framing apparatus as defined in claim 1, wherein said rear framer comprises an upright panel supporting frame on which the rear panel is supported by said rear panel holders, a carrier on which said upright panel supporting frame is mounted for vertical movement, and a fourth drive for raising and lowering said panel supporting frame relative to said carrier, said carrier being movably support ed on said rear tracks.

5. Framing apparatus as defined in claim 1, and further including a rear loading platform at the rear of said base to support a bottom panel for transfer to said base.

6. Framing apparatus as defined in claim 5, and further including a front discharge ramp for transfer of the body parts after they have been connected together at said framing station.

7. Framing apparatus as defined in claim 1, and further comprising tooling for connecting together said side, rear and bottom panels in the advanced positions of said side and rear framers.

8. Framing apparatus as defined in claim 7, wherein said tooling is mounted on one or more of said framers.

9. Framing apparatus as defined in claim 7, wherein said tooling is mounted on said side framers.

10. Framing apparatus as defined in claim 2, wherein said body parts include a header, and releasable clamps on said side framers for clamping said header in alignment with said side panels.

11. Framing apparatus as defined in claim 10, wherein said rear framer comprises an upright panel supporting frame on which the rear panel is supported by said rear panel holders, a carrier on which said upright panel supporting frame is mounted for vertical movement and a fourth drive for raising and lowering said panel supporting frame relative to said carrier, said carrier being movably supported on said rear tracks.

12. Framing apparatus as defined in claim 11 and further including a rear loading platform at the rear of said base to support a bottom panel for transfer to the base, and a front discharge ramp for transfer of the body parts after they have been connected together at said framing station.

13. Framing apparatus as defined in claim 12, and further comprising tooling for connecting together the body parts in the advanced positions of said side and rear framers.

14. Framing apparatus as defined in claim 13, wherein said tooling is mounted on said side framers.

15. Framing apparatus as defined in claim 13, wherein said tooling is mounted on said rear framer.

\* \* \* \* \*